US010103362B2

United States Patent
Kajita et al.

(10) Patent No.: US 10,103,362 B2
(45) Date of Patent: Oct. 16, 2018

(54) RECHARGEABLE BATTERY AND METHOD FOR MOLDING INSULATOR

(71) Applicant: PRIMEARTH EV ENERGY CO., LTD., Kosai-shi, Shizuoka (JP)

(72) Inventors: Kaoru Kajita, Toyohashi (JP); Makoto Imamura, Kosai (JP); Hajime Konishi, Ikoma (JP)

(73) Assignee: PRIMEARTH EV ENERGY CO., LTD., Kosai-Shi (JP)

( * ) Notice: Subject to any disclaimer, the term of this patent is extended or adjusted under 35 U.S.C. 154(b) by 77 days.

(21) Appl. No.: 15/392,086

(22) Filed: Dec. 28, 2016

(65) Prior Publication Data

US 2017/0222194 A1   Aug. 3, 2017

(30) Foreign Application Priority Data

Feb. 2, 2016   (JP) ................. 2016-017749

(51) Int. Cl.
| | |
|---|---|
| H01M 2/02 | (2006.01) |
| H01M 2/04 | (2006.01) |
| B29C 45/16 | (2006.01) |
| H01M 2/06 | (2006.01) |
| H01M 2/30 | (2006.01) |
| H01M 10/0525 | (2010.01) |
| B29K 77/00 | (2006.01) |
| B29K 81/00 | (2006.01) |
| B29L 31/00 | (2006.01) |

(52) U.S. Cl.
CPC ......... H01M 2/043 (2013.01); B29C 45/1615 (2013.01); H01M 2/0277 (2013.01); H01M 2/06 (2013.01); H01M 2/30 (2013.01); H01M 10/0525 (2013.01); B29K 2077/00 (2013.01); B29K 2081/04 (2013.01); B29K 2995/0007 (2013.01); B29L 2031/7146 (2013.01); H01M 2220/20 (2013.01)

(58) Field of Classification Search
CPC ........................................................ H01M 4/02
See application file for complete search history.

(56) References Cited

U.S. PATENT DOCUMENTS

2014/0227581 A1   8/2014   Ohta
2015/0303441 A1*  10/2015  Takagi ............... H01M 2/22
                                                   429/61

FOREIGN PATENT DOCUMENTS

WO   2013/030869 A1   3/2013

* cited by examiner

*Primary Examiner* — Jacob B Marks
(74) *Attorney, Agent, or Firm* — Maschoff Brennan (57) ABSTRACT

A rechargeable battery includes a battery case, a cover that closes an open end of the battery case, and a power collection terminal arranged on the cover to supply power from a power generating element to an external terminal. The power collection terminal extends through a gasket arranged on a lower surface of the cover, an insulator arranged on an upper surface of the cover, and the external terminal arranged on an upper surface of the insulator. An annular sealing member is held between the lower surface of the cover and the gasket. The insulator is a resin-molded component. The insulator includes a through hole defined by an inner wall that includes a lower open end, an upper open end, and a central portion. At least one of the lower open end and the upper open end has a larger diameter than the central portion.

7 Claims, 4 Drawing Sheets

RECHARGEABLE BATTERY AND METHOD FOR MOLDING INSULATOR

CROSS-REFERENCE TO RELATED APPLICATIONS

This application is based upon and claims the benefit of priority from prior Japanese Patent Application No. 2016-017749, filed on Feb. 2, 2016, the entire contents of which are incorporated herein by reference.

BACKGROUND ART

The present invention relates to a rechargeable battery that includes an external terminal and a method for molding an insulator that insulates the case of a rechargeable battery from a power collection terminal, which supports an external terminal.

An assembled battery known in the prior art is formed by connecting a plurality of rechargeable batteries with bus bars to obtain high capacity and high power output. Each bus bar is coupled to a connection terminal that projects from an external terminal of the battery and is fastened with the connection terminal by a nut. This electrically connects and mechanically fastens the bus bar to the external terminal. Each rechargeable battery includes a power collection terminal that is connected to the external terminal and used to draw electricity out of the battery. When external force is applied to the external terminal through the bus bar in a vertical direction or a lateral direction, a large load may be applied to the power collection terminal. In this regard, International Patent Publication No. WO2013/030869 describes one example of a technique that reduces the load applied to the power collection terminal.

International Patent Publication No. WO2013/030869 describes a rechargeable battery that includes connection terminals (terminal electrodes), power collection terminals, and external terminals (connection electrodes). Each connection terminal (terminal electrode) is located outside the cover of a box-shaped battery case that has a closed end and accommodates a power generating element. The connection terminal is used for connection to another battery. Each power collection terminal extends through the cover and is used to draw power from the power generating element to the outside of the battery case. Each external terminal (connection electrode) is coupled to the one of the power collection terminals and supports one of the connection terminals (terminal electrodes). The external terminal (connection electrode) is located outside the battery case and includes a first flat portion, which is connected to the connection terminal (terminal electrode), and a second flat portion, which is connected to the power collection terminal. The first flat portion and the second flat portion are arranged at different levels and have overlapped regions as viewed in a direction orthogonal to the thickness-wise direction of the external terminal (connection electrode).

SUMMARY OF THE INVENTION

According to the technique described in International Patent Publication No. WO2013/030869, the load applied to the power collection terminal through the external terminal (connection electrode) is reduced by arranging the external terminal (connection electrode) between the connection terminal (terminal electrode) and the power collection terminal.

The connection terminal, the power collection terminal, and the external terminal need to be insulated from the battery case and the like. Thus, an insulator needs be arranged between the battery case and each terminal. The power collection terminal extends from the inside to the outside of the battery case. A gasket is arranged between the power collection terminal and the cover of the battery case. The gasket is held between the power collection terminal and the cover of the battery case under a predetermined pressure. This hermetically seals the battery case. More specifically, the power collection terminal holds the gasket, the cover of the battery case, the insulator, and the external terminal in this order from an inner side to an outer side of the battery case with the predetermined pressure. The insulator is molded from an insulative resin. The insulator includes a through hole through which the power collection terminal is inserted. The molding forms a weld line in the insulator at the through hole. Thus, the strength of the insulator is relatively low at the portion where the weld line is located. The inserted power collection terminal applies the predetermined pressure to the weld line portion. This may adversely affect the durability of the insulator.

One aspect of the present invention is a rechargeable battery that includes a battery case, a cover, a gasket, an insulator, an external terminal, a power collection terminal, and an annular sealing member. The battery case includes an open end and accommodates a power generating element. The cover closes the open end of the battery case and includes an upper surface, a lower surface, a through hole that extends between the upper surface and the lower surface, and an inner wall that defines the through hole. The gasket includes a tubular contact portion arranged on the inner wall of the cover, a through hole defined by the tubular contact portion, and a planar portion that is continuous with the tubular contact portion and arranged on the lower surface of the cover. The insulator is arranged on the upper surface of the cover and includes an upper surface, a lower surface, and a through hole that extends between the upper surface and the lower surface and is in communication with the through hole of the gasket. The external terminal is arranged on the upper surface of the insulator and includes an upper surface, a lower surface, a through hole that extends between the upper surface and the lower surface and is in communication with the through hole of the insulator, and an inner wall that defines the through hole of the external terminal. The power collection terminal extends through the through hole of the gasket, the through hole of the insulator, and the through hole of the external terminal to supply power from the power generating element to the external terminal. The annular sealing member is held between the lower surface of the cover and the planar portion of the gasket at an outer side of the tubular contact portion of the gasket. The insulator is a resin-molded component. The inner wall of the insulator includes a lower open end, an upper open end, and a central portion located between the lower open end and the upper open end. At least one of the lower open end and the upper open end of the inner wall of the insulator has a larger diameter than the central portion of the inner wall of the insulator. The diameter of the at least one of the lower open end and the upper open end is larger than a diameter of the through hole of the gasket and smaller than an inner diameter of the sealing member.

Another aspect of the present invention is a method for molding an insulator for a rechargeable battery that includes a battery case, a cover that seals the battery case, a gasket arranged on the cover inside the battery case, an external terminal arranged on the cover outside the battery case with the insulator located in between, and a power collection terminal that is inserted through a through hole formed in each of the gasket and the external terminal. The inserted power collection terminal holds the gasket, the cover, the insulator, and the external terminal. The method includes providing a first mold and a second mold that define a cavity into which a resin is injected. The first mold includes a projection that forms a through hole in the insulator, the second mold includes an annular projection that projects toward the first mold, and the annular projection includes a distal surface that includes a recess. The method further includes fitting the projection of the first mold into the recess of the second mold and resin-molding the insulator with the first mold fitted into the second mold.

Other aspects and advantages of the embodiments will become apparent from the following description, taken in conjunction with the accompanying drawings, illustrating by way of example the principles of the invention.

BRIEF DESCRIPTION OF THE DRAWINGS

The embodiments, together with objects and advantages thereof, may best be understood by reference to the following description of the presently preferred embodiments together with the accompanying drawings in which.

DESCRIPTION OF THE EMBODIMENTS

First Embodiment

A first embodiment of a rechargeable battery 1 according to the present invention will now be described with reference to FIG. 1. For example, a plurality of rechargeable batteries 1 is connected by bus bars to form an assembled battery. The assembled battery may be installed in an electric vehicle or a hybrid vehicle to supply power to an electric motor or the like. The rechargeable battery 1 may include a non-aqueous electrolyte rechargeable battery such as a lithium-ion rechargeable battery. The rechargeable battery 1 may include a box-shaped sealed battery.

The rechargeable battery 1 includes a box-shaped battery case 2, which has an opening, and a cover 3, which seals the battery case 2. The battery case 2 accommodates a power generating element 10 and an electrolytic solution. The rechargeable battery 1 includes a positive-side connection terminal 8P and a negative-side connection terminal 8N, each of which projects in a direction extending away from the cover 3. When forming the assembled battery, the positive-side connection terminal 8P and the negative-side connection terminal 8N are each connected to a bus bar.

The power generating element 10 includes a positive electrode body, a negative electrode body, and a separator, which is located between the positive electrode body and the negative electrode body. The power generating element 10 includes a positive-side end, which is electrically and mechanically connected to a positive-side power collection terminal 4P, and a negative-side end, which is electrically and mechanically connected to a negative-side power collection terminal 4N. Hereafter, the power collection terminals 4P, 4N and the connection terminals 8P, 8N may be simply referred to as the power collection terminals 4 and the connection terminals 8 unless the positive side and the negative side need to be distinguished from each other.

Each power collection terminal 4 is connected to the corresponding connection terminal 8 by an external terminal 7. This enables the external terminal 7 and the connection terminal 8 to draw power out of the power generating element 10.

Figure 1:
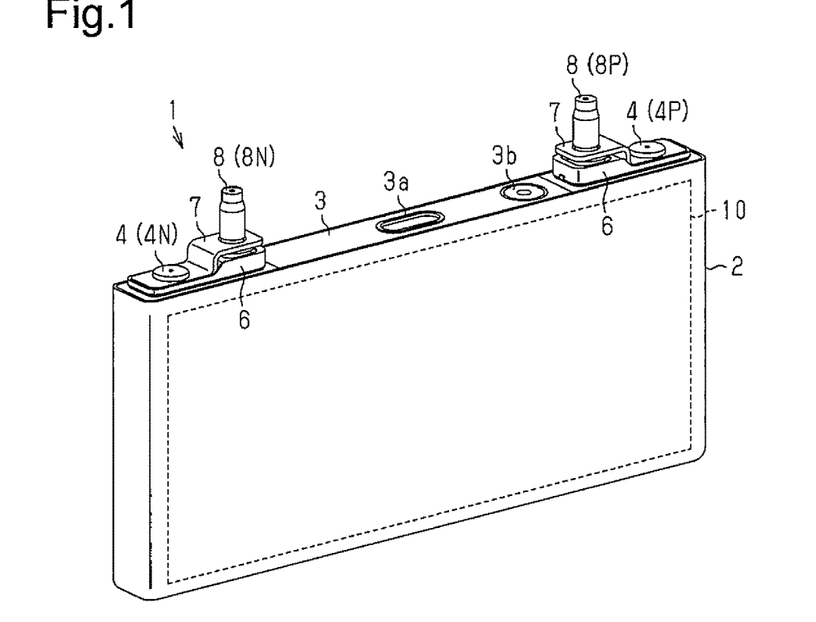
FIG. 1 is a schematic perspective view showing the structure of a first embodiment of a rechargeable battery.
Figure 2:
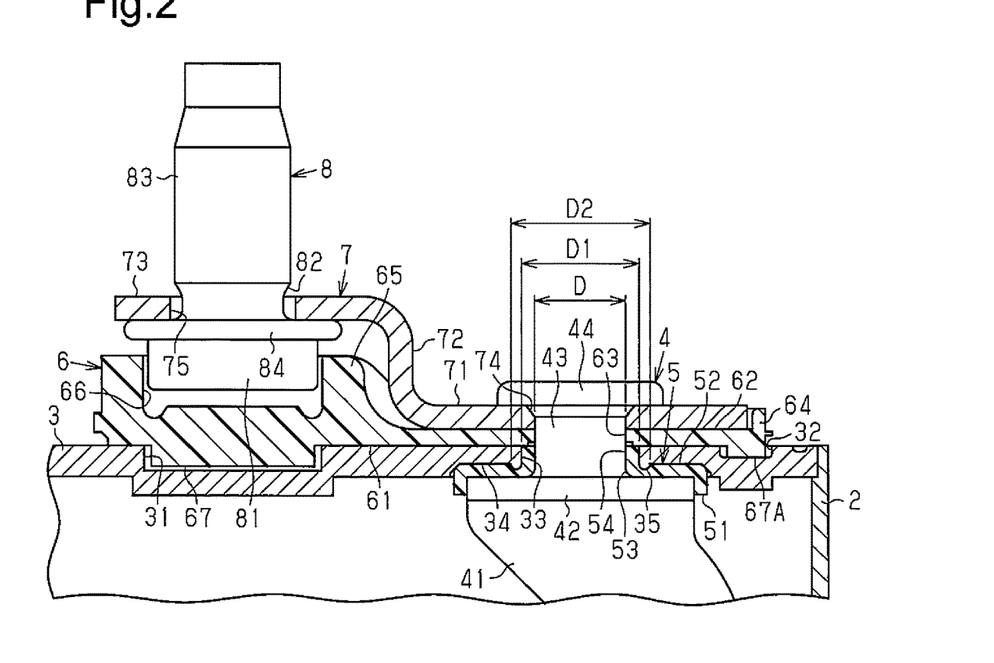
FIG. 2 is an enlarged cross-sectional view showing the structure of a power collection terminal of the first embodiment.

Referring to FIGS. 1 and 2, the structure of the power collection terminals 4 of the rechargeable battery 1 will now be schematically described. In the first embodiment, for the sake of simplicity, the direction extending toward the upper side, or outer side, of the battery case 2 as viewed in FIG. 2 will be referred to as the upper direction, and the direction extending toward the lower side, or inner side, of the battery case 2 as viewed in FIG. 2 will be referred to as the lower direction.

The rechargeable battery 1 includes the battery case 2, the cover 3, the power collection terminals 4, which extend through the cover 3 to draw power from the power generating element 10 to the outside of the battery case 2, the external terminals 7, which are connected to the respective power collection terminals 4 and located above the cover 3, and the connection terminals 8, which are connected to the respective external terminals 7 and connected to an external element. The rechargeable battery 1 also includes gaskets 5 located between each power collection terminal 4 and the cover 3. Each gasket 5 includes a planar portion 52, which is located below the cover 3, a gasket through hole 53, which is formed in the planar portion 52 to receive the power collection terminal 4, and a tubular contact portion 54, which defines the gasket through hole 53 and is in contact with a circumferential surface of the power collection terminal 4. The rechargeable battery 1 includes insulators 6 and sealing members 35. Each insulator 6 is a resin-molded component. The insulator 6 is located between the cover 3 and the corresponding external terminal 7 and includes an insulator through hole 63, through which the power collection terminal 4 extends, and an inner wall defining the insulator through hole 63. Each sealing member 35 is annular and located between a lower portion of the cover 3 and the planar portion 52 of the corresponding gasket 5 at an outer side of the tubular contact portion 54 of the gasket 5.

The inner wall of each insulator 6 includes a lower open end, an upper open end, a central portion located between the lower open end and the upper open end. At least one of the lower open end and the upper open end has a larger diameter than the central portion. The diameter of at least one of the lower open end and the upper open end is larger than the diameter of the gasket through hole 53 in the gasket 5 and smaller than the inner diameter of the sealing member 35.

Figure 3:
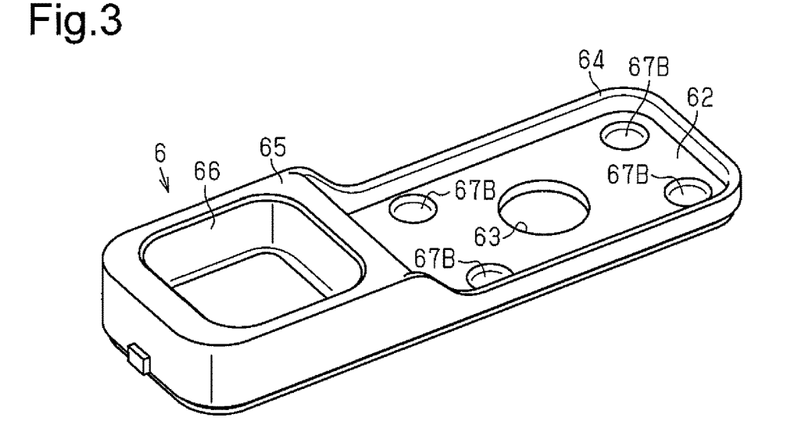
FIG. 3 is a perspective view showing the structure of an insulator of the first embodiment.
Figure 4:
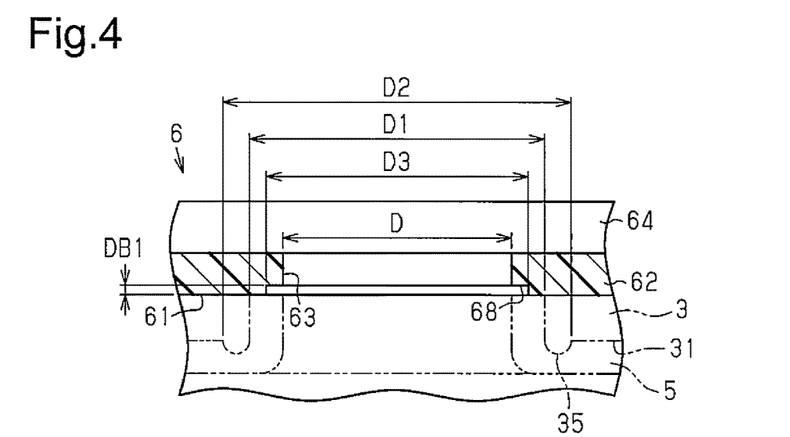
FIG. 4 is an enlarged cross-sectional view showing the structure of a through hole in the insulator of the first embodiment.

Referring to FIGS. 2 to 4, the structure for connecting the connection terminals 8 to the power generating element 10 will now be described in detail.

Each connection terminal 8 includes a tetragonal base 81 with round corners, a flange 84, which enlarges an upper surface of the base 81, and a projection 83, which orthogonally projects from a surface of the base 81 located at the side of the flange 84. The projection 83 is cylindrical and extends in a vertical direction. The projection 83 includes a threaded groove at a portion of the circumferential surface. The projection 83 is narrowed to form a recess 82 at a circumferential portion that is connected to the base 81. The recess 82 allows for movement of the connection terminal 8 relative to the external terminal 7 in a planar direction in which the surface of the flange 84 extends.

The external terminal 7 is a plate member that is formed by bending a plate of a conductive metal such as aluminum. The external terminal 7 includes a terminal fastening portion 73, a terminal fixing portion 71, and a step 72. The terminal fastening portion 73 is connected to the connection terminal 8. The terminal fixing portion 71 is connected to an extension 43 and an enlarged portion 44, which are portions of the power collection terminal 4. The terminal fastening portion 73 and the terminal fixing portion 71 are located on different steps. The step 72 forms the step difference between the terminal fastening portion 73 and the terminal fixing portion 71. The terminal fastening portion 73 extends above the cover 3 and includes a planar center that includes a terminal insertion hole 75. The terminal fixing portion 71 extends above the cover 3 and includes a planar center that includes a swage hole 74. The swage hole 74 is circular and has a diameter D, which is the smallest diameter. The step 72 extends in a direction inclined relative to the planar direction of the terminal fastening portion 73, for example, a direction orthogonal to the planar direction.

The projection 83 of the connection terminal 8 is inserted through the terminal insertion hole 75 in the terminal fastening portion 73. When forming the assembled battery, the projection 83 is inserted through a through hole of a bus bar (not shown) and fastened with the bus bar by a nut (not shown). This electrically and mechanically connects one end of the bus bar to the connection terminal 8 and another end of the bus bar to the external terminal of an adjacent battery (not shown). The height of the recess 82 of the connection terminal 8 is greater than the thickness of the terminal fastening portion 73 in the vertical direction. This ensures a backlash of the connection terminal 8 in the terminal insertion hole 75 in the planar direction of the base 81. The backlash reduces transmission of force applied to the bus bar.

The insulator 6 includes an annular side wall 65, a base receptacle 66, and a terminal support portion 62. The base receptacle 66 includes a recess that receives the base 81 and is formed by the side wall 65. The terminal support portion 62 supports the terminal fixing portion 71. The insulator 6, which has insulation properties, is located between the external terminal 7 and the connection terminal 8 to prevent the external terminal 7 and the connection terminal 8 from being short-circuited with the cover 3. The insulator 6 is injection-molded from an insulative resin such as a nylon (PA) resin or a polyphenylene sulfide (PPS) resin.

The annular side wall 65 surrounds the base 81 of the connection terminal 8, which is accommodated in the base receptacle 66, and limits displacement of the base 81 in the planar direction of the base 81. This prevents short-circuiting of the rechargeable battery 1 that occurs when the connection terminal 8 is separated from the insulator 6 and contacts the cover 3.

The insulator 6 includes an outer wall 64, which extends from the edge of the terminal support portion 62. The terminal fixing portion 71 of the external terminal 7 is placed on a portion of the terminal support portion 62 surrounded by the outer wall 64. The terminal support portion 62, which includes a flat surface, includes an insulator through hole 63 at a central position of the flat surface and positioning portions 67B at four position on the flat surface. The positioning portions 67B position the external terminal 7. The insulator through hole 63 is located at a position overlapping with the swage hole 74 of the terminal fixing portion 71 placed on the terminal support portion 62. The insertion through hole 63 is circular and has the diameter D, which is equal to the diameter D of the swage hole 74. The terminal support portion 62 surrounds the terminal fixing portion 71 with the outer wall 64 to restrict horizontal movement of the terminal fixing portion 71. This prevents short-circuiting of the rechargeable battery 1 that occurs when the external terminal 7 is separated from the insulator 6 and contacts the cover 3.

As shown in FIG. 2, the insulator 6 includes a bottom portion 61 opposed to the cover 3. The bottom portion 61 includes first and second projections 67, 67A. The first projection 67 is located below the base receptacle 66. The second projection 67A is located below the terminal support portion 62 at a position separated from the first projection 67.

The cover 3 is a rectangular plate member. The cover 3 is laser-welded to walls of the battery case 2 defining the opening. The cover 3 includes a gas release valve 3a (refer to FIG. 1) at a longitudinally middle position. The gas release valve 3a brakes when the internal pressure of the battery case 2 reaches the actuation pressure. The cover 3 also includes an electrolytic solution inlet 3b, which is located between the gas release valve 3a (refer to FIG. 1) and the positive-side connection terminal 8P and used when adding the electrolytic solution into the battery case 2.

The cover 3 includes an upper portion to which the insulator 6 is fixed. The upper surface of the cover 3 is recessed to form a first rotation restriction portion 31 and a second rotation restriction portion 32.

The first rotation restriction portion 31 is formed to accommodate and surround the first projection 67 of the insulator 6. The second rotation restriction portion 32 is formed to accommodate and surround the second projection 67A of the insulator 6. Thus, when rotational force is applied to the insulator 6 in the horizontal direction, outer surfaces of the first and second projections 67, 67A come into contact with inner surfaces of the first and second rotation restriction portions 31, 32 to restrict rotation of the insulator 6.

The upper surface of the cover 3 is partially recessed to form the first and second rotation restriction portions 31, 32. This allows the connection terminal 8 to be located in a region closer to the battery case 2 thereby miniaturizing the rechargeable battery 1.

The cover 3 includes a cover through hole 33, which extends through the upper surface and the lower surface of the cover 3. The cover through hole 33 is circular and has diameter D1, which is larger than the diameter D of the insulator through hole 63. The lower surface of the cover 3 is recessed at a position where the gasket 5 is located to form a gasket seat 34 in a range that surrounds the periphery of the insulator through hole 63. The cover 3 includes the sealing member 35, which is an annular projection formed on a lower portion of the gasket seat 34 defining the cover through hole 33. The sealing member 35 is annular and has inner diameter D1. When the gasket 5 is located on the gasket seat 34, the sealing member 35 compresses an opposing portion of the gasket 5.

The gasket 5 is located between the cover 3 and the power collection terminal 4.

The gasket 5 is formed from an insulative material. The insulative material may be rubber or resin. The gasket 5 is located on the gasket seat 34, which is located at a lower side of the cover 3. The gasket 5 includes a planar portion 52, which is in contact with the gasket seat 34, and a tubular edge wall 51, which downwardly extends from the edge of the planar portion 52 to surround the contact portion 42 of the power collection terminal 4. The gasket 5 also includes the gasket through hole 53, which is located at a central position of the planar portion 52, and the tubular contact portion 54, which upwardly extends from the open end defining the gasket through hole 53.

Planar contact of the upper surface of the planar portion 52 with the gasket seat 34 of the cover 3 increases the hermetic seal of the battery case 2 between the cover 3 and the gasket 5. Additionally, planar contact of the lower surface of the planar portion 52 with the contact portion 42 of the power collection terminal 4 increases the hermetic seal of the battery case 2 between the power collection terminal 4 and the gasket 5.

The tubular edge wall 51 surrounds the contact portion 42 of the power collection terminal 4.

The gasket through hole 53 extends at the central position of the planar portion 52 to communicate the cover through hole 33. The gasket through hole 53 is circular and has diameter D, which is equal to the diameter D of the insulator through hole 63 in the insulator 6.

The tubular contact portion 54 upwardly extends from the planar portion 52 to define the gasket through hole 53. The upper end of the tubular contact portion 54 is located at a position of the lower surface of the insulator 6 or lower, that is, a position of the upper surface of the cover 3 or lower. Thus, the tubular contact portion 54, which upwardly projects from the planar portion 52, is accommodated in the cover through hole 33 of the cover 3. The gasket through hole 53 is in communication with the insulator through hole 63 in the insulator 6. The gasket through hole 53 and the insulator through hole 63 have the same diameter. The inner wall shape of the tubular contact portion 54 conforms to the shape of an inner wall of the cover 3 that defines the cover through hole 33 and has the diameter D1. The tubular contact portion 54 has a circular opening with the diameter D. The tubular contact portion 54 is formed by a wall the thickness of which is, for example, "(D1−D)/2" or smaller when the thickness is the same throughout the wall. When the tubular contact portion 54 of the gasket 5 is accommodated in the cover through hole 33 of the cover 3, the tubular contact portion 54 of the gasket 5 is located between the power collection terminal 4 and the cover 3 with respect to the horizontal direction. Thus, the tubular contact portion 54 of the gasket 5 ensures the electrical insulation between the power collection terminal 4 and the cover 3.

As described above, the gasket 5, the cover 3, the insulator 6, and the external terminal 7 are stacked in the battery case 2 in order from the lower side (inner side). In the battery case 2, the through holes, namely, the gasket through hole 53, the cover through hole 33, the insulator through hole 63, and the swage hole 74 are in communication with one another.

The power collection terminal 4 includes a connection portion 41, which is connected to the power generating element 10, the contact portion 42, which is in contact with the lower surface of the cover 3 with the gasket 5 located in between, the extension 43, which projects from a central part of the contact portion 42, and the enlarged portion 44, which defines a distal end of the extension 43 and is located above the battery case 2.

The circumference of the contact portion 42 is surrounded by the tubular edge wall 51 of the gasket 5. The upper end of the contact portion 42 is in contact with the lower surface of the cover 3 with the gasket 5 located in between.

The extension 43, which projects from the upper end of the contact portion 42, is cylindrical and has the diameter D. The extension 43 is inserted through each through hole of the battery case 2 from the inside to the outside of the battery case 2. The extension 43 may be arranged orthogonal to the upper end surface of the contact portion 42. The circumferential surface of the extension 43 is in close contact with the inner circumferential surface of the tubular contact portion 54. This increases the hermetic seal of the battery case 2.

The enlarged portion 44 is located outside the battery case 2 projecting from the swage hole 74 of the external terminal 7. The enlarged portion 44 is larger than the swage hole 74 of the external terminal 7. The enlarged portion 44 is formed by downwardly pressing and plastically deforming the distal end of the extension 43 that is projected out of the swage hole 74. When downwardly pressed and enlarged, the enlarged portion 44 comes into contact with the surface of the terminal fixing portion 71 of the external terminal 7 and downwardly presses the external terminal 7 with a predetermined pressure. This presses portions held between the enlarged portion 44 and the contact portion 42 with the predetermined pressure acting in the vertical direction (through direction). More specifically, the predetermined pressure is applied to a portion of the gasket 5 proximate to the through hole 53, a portion of the cover 3 proximate to the through hole 33, a portion of the insulator 6 proximate to the through hole 63, and a portion of the external terminal 7 proximate to the swage hole 74 that are held between the enlarged portion 44 and the contact portion 42.

The predetermined vertical pressure compresses the planar portion 52 of the gasket 5 to further ensure contact between the gasket 5 and the cover 3 and between the gasket 5 and the contact portion 42. More specifically, the predetermined pressure increases the hermetic seal of the battery case 2.

The operation of the insulator 6 of the first embodiment will now be described with reference to FIG. 4.

The insulator 6 of the first embodiment includes a buffer 68, which is formed by widening the lower end of the insulator through hole 63 in a stepped manner. The buffer 68 includes a recess that has a height DB1 from the lower portion of the insulator 6 in the vertical direction. The buffer 68 is circular and has a diameter D3, which is greater than the diameter D. The diameter D3 is greater than the diameter D of the insulator through hole 63 and smaller than or equal to the inner diameter D1 of the sealing member 35.

When the diameter D3 is smaller than or equal to the diameter D1, there is no gap between the insulator 6 and the cover 3. Thus, the sealing member 35 is pressed to the planar portion 52 of the gasket 5 at the predetermined pressure, which is applied when the sealing member 35 is held by the power collection terminal 4. This increases the hermetic seal between the cover 3 and the gasket 5.

When molded from a resin, the insulator 6 includes at least one weld line that extends radially outward from the inner wall that defines the insulator through hole 63. The at least one weld line is a portion where molten resin flows meet and fuse together. A mold used for resin-molding the insulator 6 includes a pin that forms the insulator through hole 63 in the insulator 6. Thus, the pin always divides the resin into two flows, and the two resin flows join at a downstream side of the resin. The weld line exists in a portion that takes time to join, that is, a portion located at the rear of the pin. Such a portion has a tendency to have the lowest strength of the portion located proximate to the inner wall defining the insulator through hole 63. This lowers the pressure resistance and the reliability of the portion proximate to the inner wall defining the insulator through hole 63. The portion proximate to the inner wall defining the insulator through hole 63 is held by the power collection terminal 4 and receives the predetermined pressure. In this regard, in the first embodiment, the inner wall defining the insulator through hole 63 is recessed at a vertical end to form the buffer 68. This forms a gap between the gasket 5 and the portion proximate to the inner wall defining the insulator through hole 63. Consequently, the predetermined pressure in the vertical direction is prevented from being applied to the portion proximate to the inner wall defining the insulator through hole 63. This limits situations in which cracks or the like are formed in the portion proximate to the inner wall defining the insulator through hole 63, which have a low pressure resistance, and increases the reliability of the rechargeable battery 1.

The location where the weld line is formed varies depending on the molds and the position from which the resin is injected. In this regard, the buffer 68 is arranged to extend around the inner wall defining the insulator through hole 63. This limits application of the predetermined pressure to a portion that has a lower pressure resistance caused by the weld line regardless of where the weld line is formed in the inner wall defining the insulator through hole 63.

The manufacturing of the insulator 6 will now be described with reference to FIG. 5. The insulator 6 is manufactured through injection molding to have the buffer 68 in the insulator through hole 63.

The manufacturing of the insulator 6 will now be schematically described.

As described above, in the rechargeable battery 1, the gasket 5 is located on the lower portion of the cover 3, which seals the battery case 2, the external terminal 7 is located on the upper portion of the cover 3 with the insulator 6 located in between, and the power collection terminal 4 is inserted through the through holes formed in the gasket 5, the cover 3, the insulator 6, and the external terminal 7. Then, the power collection terminal 4 holds the gasket 5, the cover 3, the insulator 6, and the external terminal 7. The insulator 6, which is used in the rechargeable battery 1, is resin-molded using a first mold 110 and a second mold 100, which define a cavity where the resin is injected. The first mold 110 includes a base 111 and a projection 112, which is formed on a surface of the base 111 and corresponds to the insulator through hole 63 of the insulator 6. The second mold 100 includes a base 101 and an annular projection 102 (circumferential portion), which is formed on a surface of the base 101, and a recess 103, which is formed in a distal surface of the projection 102. When resin-molding the insulator 6, the projection 112 of the first mold 110 is fitted into the recess 103 of the second mold 100. In this case, the bottom wall of the recess 103 in the second mold 100 is somewhat spaced apart from the distal surface of the projection 112 of the first mold 110.

A method for molding the insulator 6 will now be described in detail.

The first mold 110 and the second mold 100 are combined to define a cavity, and a resin is injected into the cavity to manufacture the insulator 6. The first mold 110 includes the projection 112 (core pin), which forms the insulator through hole 63 in the insulator 6. The second mold 100 includes the recess 103 (cavity), into which the projection 112 is fitted. The projection 112 is cylindrical and has the diameter D. The recess 103 has a circular hole with the diameter D.

The first mold 110 molds an upper portion (portion that will be in contact with the external terminal 7) of the insulator 6.

The second mold 100 molds a lower portion (portion that will be in contact with the cover 3) of the insulator 6.

The projection 112 is integrated with the base 111 of the first mold 110. The projection 112 and the base 111 may be formed integrally with each other. Alternatively, separate members may be integrated with each other. This forms no gap between the base 111 and the projection 112. Thus, a burr is not formed between the base 111 and the projection 112.

The recess 103 is defined by the annular circumferential portion 102, which projects from the surface of the base 101 of the second mold 100. The depth of the recess 103 is greater than the depth of the surface of the base 101 from the distal surface of the circumferential portion 102. The circumferential portion 102 forms the buffer 68 in the insulator 6. The circumferential portion 102, which has the height DB1 from the surface of the base 101, has the form of a circle with the inner diameter D and the outer diameter D3 in a direction extending along the surface of the base 101.

When molding the insulator 6, the second mold 100 is combined with the first mold 110. The projection 112 includes a tapered distal end 113. When the first mold 110 is combined with the second mold 100, the projection 112 is inserted into the recess 103 of the second mold 100 to the portion that has the diameter D. This forms a slight gap between the recess 103 (circumferential portion 102) and the projection 112 in a direction in which the projection 112 is inserted. Entrance of the resin into the slight gap forms burrs in the buffer 68 extending along the inner wall of the diameter D in a direction in which the projection 112 extends.

Figure 11:
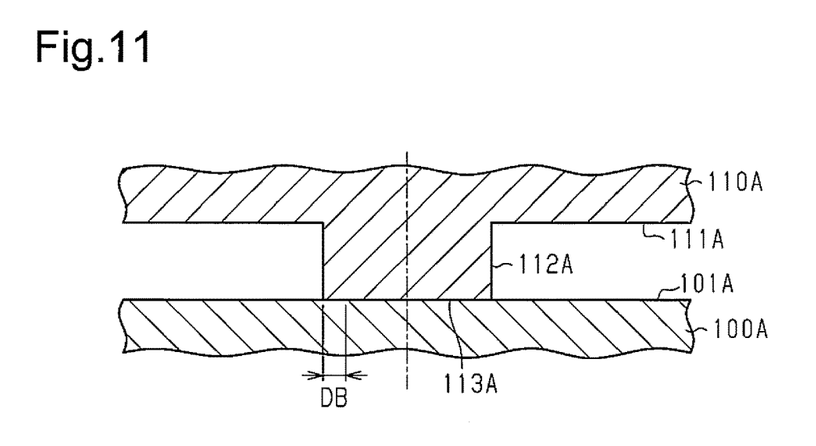
FIG. 11 is a schematic end view showing the structure of molds used for molding an insulator of a prior art rechargeable battery.

FIG. 11 shows a prior art example in which a first mold 110A includes a base 111A and a projection 112A, which is formed on the base 111A and includes a distal end 113A. A second mold 100A includes a base 101A. The distal end 113A of the projection 112A of the first mold 110A is in direct contact with the base 101A of the second mold 100A. In this case, burrs are formed below the projection 112A between the first mold 110A and the second mold 100A. The burrs may have, for example, length DB and thereby narrow the opening.

In the present embodiment, burrs do not narrow the inner wall defining the insulator through hole 63. This allows the extension 43 to be smoothly fitted into the insulator through hole 63 when assembling the rechargeable battery 1. Contact of burrs with the tubular contact portion 54 of the gasket 5 will be avoided as long as the dimensions of the burrs in the extension direction of the projection 112 are smaller than or equal to the height DB1 from the surface of the base 101. This limits the need for correcting defects such as displacement of the insulator 6 toward the upper side when assembling the rechargeable battery 1.

Figure 5:
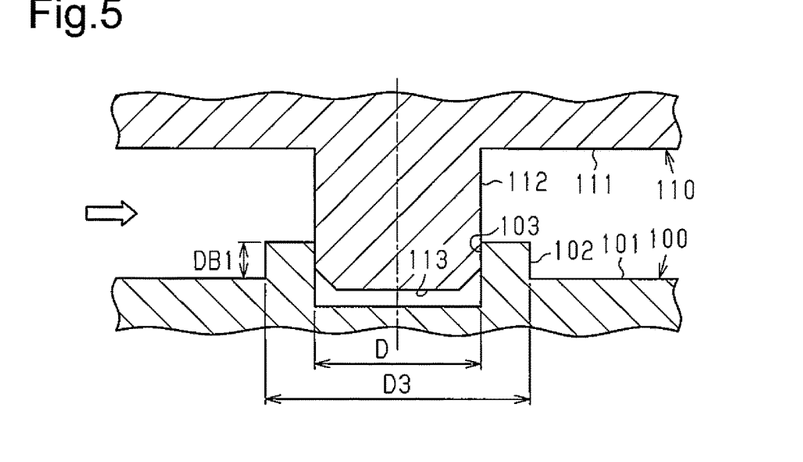
FIG. 5 is a schematic end view showing the structure of molds used for molding the insulator of the first embodiment.

For example, the resin is injected into the molds, which are formed by combining the second mold 100 with the first mold 110, from the direction of the arrow shown at the left side in FIG. 5. When the resin reaches the projection 112 from the left side, the resin is divided by the projection 112 into two flows. The resin flows pass the projection 112 and then join. The joined portions form the weld line in which the resin flows fuse together. The circumferential portion 102 of the second mold 100 is separated from a position proximate to the circumferential surface of the projection 112. Thus, the buffer 68 is formed in the insulator through hole 63 at a position separated from the portion having the lowest pressure resistance caused by the weld line. The buffer 68 receives the predetermined pressure. Thus, even when the insulator 6 is resin-molded to include the insulator through hole 63 that receives the predetermined pressure from the power collection terminal 4, which supports the external terminal 7, the insulator through hole 63 maintains the resistance to the received pressure.

Accordingly, the rechargeable battery 1 of the present embodiment has the advantages described below.

(1) The injection-molded insulator 6 includes a weld line, in which the resin flows join from the opposite sides, at a position around the insulator through hole 63. The portion having the weld line has a relatively lower strength than other portions. The strength tends to be further lowered particularly in the portion proximate to the inner wall defining the insulator through hole 63 where the joining of the resin takes the longest time. The power collection terminal 4, which extends through the insulator through hole 63, fastens the insulator 6 of the rechargeable battery 1 in the vertical direction. Thus, high pressure is applied to a position proximate to the insulator through hole 63.

In this regard, in the present embodiment, the end portion defining the insulator through hole 63 in the insulator 6 has a larger inner diameter and is recessed. This reduces the pressure applied from the power collect terminal to the weld line having the lowest pressure resistance and limits formation of cracks or the like.

The insulator 6 includes a burr formed along contact portions of the molds that form the insulator through hole 63. In this regard, the molds have the form in which the projection 112 (pin) is inserted into the circumferential portion 102, which enlarges the end portion defining the insulator through hole 63. When such molds are used, a burr is formed in the vertical direction but not in a direction that decreases the diameter of the insulator through hole 63. This limits decreases in the diameter caused by the burr thereby limiting coupling defects of the power collection terminal 4 to the insulator through hole 63. Although the burr is formed in the vertical direction, the upward recess formed in conformance with the step (height DB1) limits coupling defects caused by the burr contacting another member that overlaps with the insulator 6 below the insulator 6.

If the enlarged end portion of the insulator through hole 63 is greater than the inner diameter of the sealing member 35 as viewed in the vertical direction, the pressure applied to the gasket 5 from the sealing member 35 may be attenuated. In this regard, the diameter of the enlarged buffer in the through hole is less than or equal to the length from the inner wall defining the insulator through hole 63 to the inner circumference of the sealing member 35. This allows for sufficient transmission of the pressure applied from the sealing member 35 to the gasket 5 and maintains the satisfactory hermetic seal between the gasket 5 and the cover 3.

(2) Even when the sealing member 35 is arranged in contact with the tubular contact portion 54, the pressure applied from the sealing member 35 is transmitted to the gasket 5. Additionally, the diameter of the buffer 68 is smaller than or equal to the outer diameter (D1) of the tubular contact portion 54. This reduces the gap formed between the insulator 6 and the gasket 5.

(3) The circumferential portion 102 is rectangular in a cross-sectional view taken in the vertical direction. This facilitates formation of the molds used for injection molding.

(4) The insulator through hole 63 is larger at the end portion located at a side contacting the cover 3 than at the central portion that has the diameter D. This reduces the pressure applied from the cover 3 to the central portion of the inner wall defining the insulator through hole 63.

(5) The insulator 6 may be appropriately formed from nylon (PA) or polyphenylene sulfide (PPS), which is suitable for molding the insulator 6 but has a tendency to form burrs.

(6) The sealing member 35 is formed on the edge (lower portion) of the cover 3. Thus, the hermetic seal may be maintained between the cover 3 and the gasket 5 in an easy ensured manner.

(7) The insulator 6 includes a burr that extends along the gap formed between the molds used for forming the insulator through hole 63 and in contact with each other. In this regard, the molds have the form in which the projection 112 of the first mold 110 is inserted into the recess 103 of the second mold 100, which enlarges the end portion of the insulator through hole 63. Use of such molds limits formation of a burr in a radially inward direction and prevents coupling defects caused by the burr that decreases the inner diameter. Even when the burr is formed in the vertical direction, the end portion of the insulator through hole 63 is recessed in conformance with the height of the circumferential portion 102 (projection), which defines the recess 103 in the second mold 100. This limits coupling defects caused by the burr contacting another member that overlaps with the insulator 6 in the vertical direction.

Second Embodiment

A second embodiment of a rechargeable battery 1 will now be described with reference to FIGS. 6 and 7. The present embodiment differs from the first embodiment in that a buffer 68A includes a tapered surface to inwardly narrow. Thus, the structure that differs from that of the first embodiment will be mainly described in detail below. For the sake of brevity, the same reference characters are given to the same components, and such components will not be described in detail.

Figure 6:
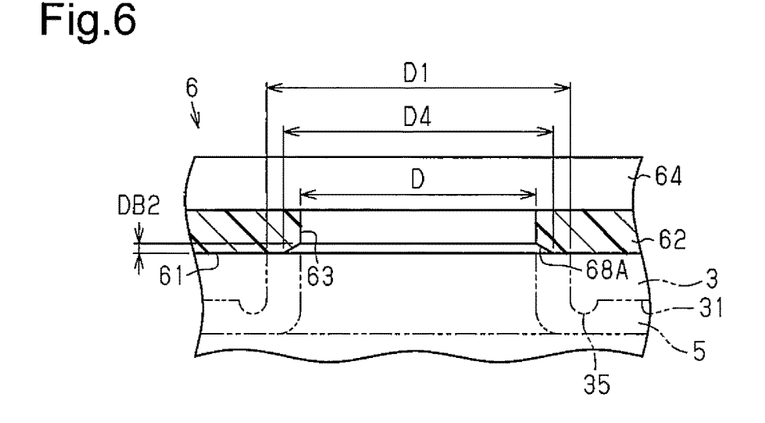
FIG. 6 is an enlarged cross-sectional view showing the structure of a through hole of an insulator in a second embodiment of a rechargeable battery.

As shown in FIG. 6, the insulator 6 of the second embodiment includes the buffer 68A, which is formed at a lower end of the insulator through hole 63. The buffer 68A is larger than the insulator through hole 63 and defined by a tapered surface that narrows toward the upper side. The buffer 68A is a recess with a height DB2 from the lower surface of the insulator 6 in the vertical direction (through direction). The buffer 68A is circular and has a diameter D4, which is greater than the diameter D. The diameter D4 is greater than the diameter D of the insulator through hole 63 and smaller than or equal to the inner diameter D1 of the sealing member 35. More specifically, the buffer 68A includes a tapered surface that defines a circular opening that has the diameter D4 at a lower side of the insulator 6 and a circular opening that has the diameter D at the height DB2 from the lower side of the insulator 6 in the vertical direction.

In the second embodiment, the buffer 68A is formed at the end of the insulator through hole 63. Consequently, the gasket 5 is spaced apart from the portion proximate to the inner wall defining the insulator through hole 63. This prevents application of the predetermined pressure to the portion proximate to the inner wall defining the insulator through hole 63 and limits situations in which cracks or the like are formed in the portion proximate to the inner wall defining the insulator through hole 63, which have a low pressure resistance. Thus, the reliability of the rechargeable battery 1 is increased.

The manufacturing of the insulator 6 will now be described with reference to FIG. 7. The insulator 6 is manufactured through injection molding to include the buffer 68A in the insulator through hole 63.

The first mold 110 and the second mold 100 are combined to form a cavity, and a resin is injected into the cavity to manufacture the insulator 6. The first mold 110 includes the projection 112 (core pin), which forms the insulator through hole 63 in the insulator 6. The second mold 100 includes a recess 103A (cavity), to which the distal end of the projection 112 is fitted. The projection 112 is cylindrical and has the diameter D. The recess 103A is a circular hole with the diameter D.

The recess 103A is defined by an annular circumferential portion 102A, which projects from the surface of the base 101 of the second mold 100. The depth of the recess 103A is greater than the depth of the surface of the base 101 from the distal surface of the circumferential portion 102A. The circumferential portion 102A forms the buffer 68A in the insulator 6. The circumferential portion 102A includes an inner wall, which has the diameter D and defines the recess 103A, and an outer rim, which has the diameter D4 and is located at the same height as the surface of the base 101. The inner wall of the circumferential portion 102A includes an upper open end with a height DB2 from the surface of the base 101. The circumferential portion 102A is inclined from the upper open end of the inner wall to the outer rim.

Figure 7:
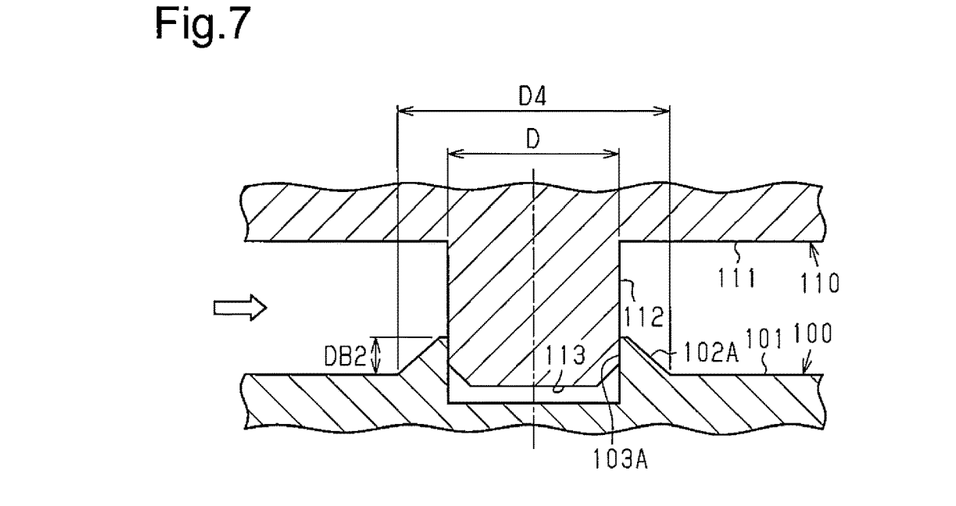
FIG. 7 is a schematic end view showing the structure of molds used for molding the insulator of the second embodiment.

For example, the resin is injected into the molds formed by combining the second mold 100 with the first mold 110 from the left side, which is the direction indicated by the arrow in FIG. 7. When the resin flows from the left side, the resin flows pass the projection 112 and then join. The joined portions form the weld line. The circumferential portion 102A of the second mold 100 is separated from the portion proximate to the circumference of the projection 112. Thus, the insulator through hole 63 includes the buffer 68A at a position separated from the portion having the lowest pressure resistance caused by the weld line. The buffer 68A receives the predetermined pressure. Thus, even when the insulator 6 is resin-molded to include the insulator through hole 63 that receives the predetermined pressure from the power collection terminal 4, which supports the external terminal 7, the insulator through hole 63 maintains the resistance to the received pressure.

Accordingly, the rechargeable battery 1 of the second embodiment has the advantage described below in addition to advantages (1), (2), and (4) to (7) of the first embodiment.

(8) Since the circumferential portion 102A includes the inclined surface, the molds used for injection molding have fewer corners. This facilitates the molding.

Other Embodiments

It should be apparent to those skilled in the art that the present invention may be embodied in many other specific forms without departing from the scope of the invention. Particularly, it should be understood that the present invention may be embodied in the following forms.

In the above embodiments, the buffers 68, 68A are the recesses in the lower surface of the insulator 6. Instead, the upper surface of the insulator may be recessed to form the buffer. Alternatively, the upper surface and the lower surface of the insulator may both be recessed to form the buffers.

Figure 8:
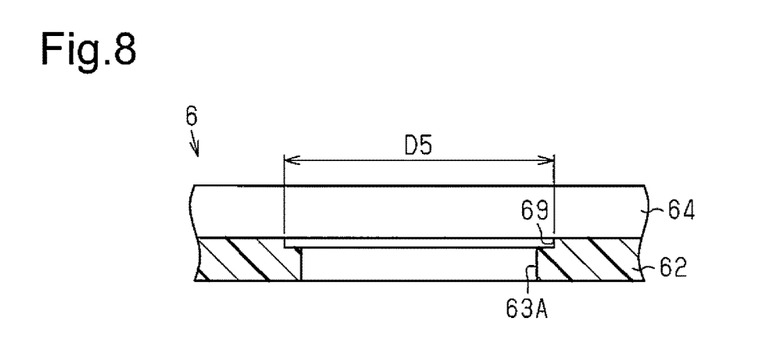
FIG. 8 is an enlarged cross-sectional view showing the structure of a through hole in an insulator of another embodiment of a rechargeable battery.

In one example, as shown in FIG. 8, a buffer 69 may be formed in the upper surface of the insulator 6 to have a larger diameter D5 than the insulator through hole 63A in a stepped manner.

Figure 9:
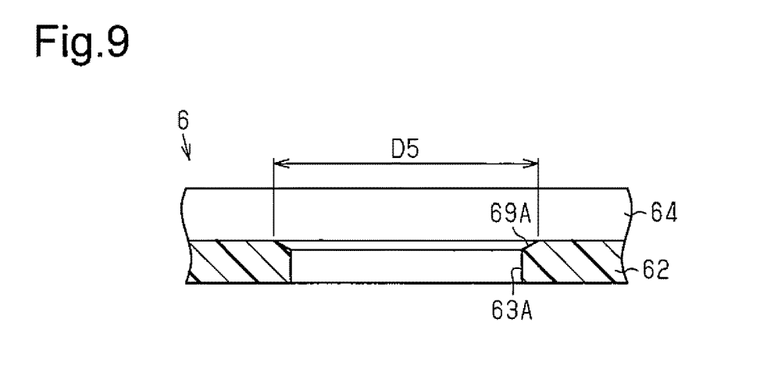
FIG. 9 is an enlarged cross-sectional view showing the structure of a through hole of an insulator in another embodiment of a rechargeable battery.

In one example, as shown in FIG. 9, a buffer 69A may be defined by a tapered surface the diameter of which decreases from the upper surface of the insulator 6 that has the large diameter D5 to a position lower than the upper surface of the insulator 6 that has the diameter of the insulator through hole 63A.

Figure 10:
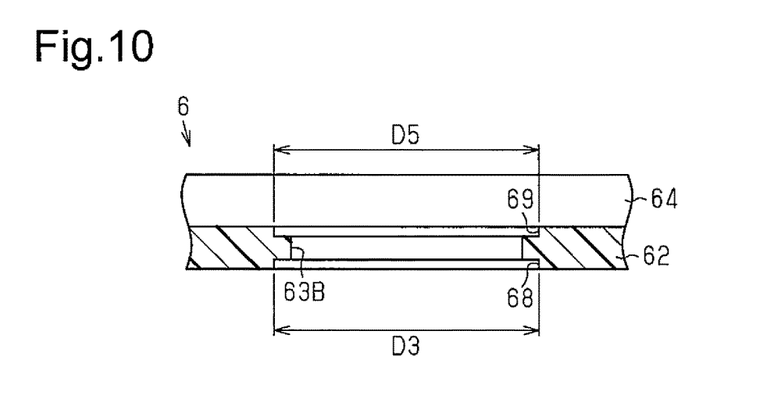
FIG. 10 is a cross-sectional view showing the structure of a through hole in an insulator in another embodiment of a rechargeable battery.

In one example, as shown in FIG. 10, the buffer 68 may be formed in the lower surface of the insulator 6, and the buffer 69 may be formed in the upper surface of the insulator 6 so that the buffer 68 and the buffer 69 are locate at opposite sides of an insulator through hole 63B formed in the insulator 6. Further, the upper and lower buffers 68, 69 may be buffers 68A, 69A each of which includes a tapered surface.

In the above embodiments, the buffers 68, 69, 68A, 69A has the form of a step or a tapered surface. However, there is no limitation to such configurations as long as the lower surface or the upper surface of the insulator is recessed, and the recess is greater in size than the inner wall defining the insulator through hole. The buffer may have the combination of a step and a tapered surface, a curved surface, or other shapes.

In each of the above embodiments, the buffer 68 extends around the insulator through hole 63. Instead, if the position where the weld line is formed can be specified, the insulator through hole may include the buffer in a range where the weld line is formed. This also reduces the pressure applied to the portion proximate to the inner wall defining the insulator through hole where the weld line is formed.

In each of the above embodiments, the distal end of the extension 43 is plastically deformed to form the enlarged portion 44. Instead, the enlarged portion may be a member other than the distal end of the extension such as a nut or a ring as long as the predetermined pressure is applicable to the external terminal.

In each of the above embodiments, the diameter D3 of the buffer 68 is smaller than or equal to the inner diameter D1 of the sealing member 35. However, the diameter D3 of the buffer 68 may be smaller than the outer diameter D2 of the sealing member 35. In this configuration, although the gap is somewhat formed between the cover and the insulator in the vertical direction, a position where the buffer is in contact with the cover is proximate to the sealing member. Thus, the sealing member is pressed to the gasket by the predetermined pressure, and the hermetic seal of the battery case is somewhat increased.

In each of the above embodiments, the extension 43 of the power collection terminal 4 is cylindrical and has the diameter D. However, the extension of the power collection terminal does not have to be circular in a cross-sectional view taken in a direction orthogonal to the direction in which the extension extends. The cross-sectional shape may be elliptical or polygonal and have a round corner. In this case, the swage hole in the external terminal, the insulator through hole, the buffer, the cover through hole, the sealing member, and the gasket through hole only need to be shaped in conformance with the cross-sectional shape of the extension.

In each of the above embodiments, the rechargeable battery 1 includes a lithium-ion rechargeable battery. Instead, a different battery, for example, a nickel-metal hydride rechargeable battery may be used.

In each of the above embodiments, a plurality of rechargeable batteries 1 is installed as an assembled battery in an electric vehicle or a hybrid vehicle. Instead, the rechargeable battery may be installed in a vehicle other than an electric vehicle or a hybrid vehicle, for example, a gasoline engine vehicle or a diesel engine vehicle. Also, the rechargeable battery may be used as a power supply for a mobile body other than a vehicle or a stationary power supply. The power supply may be used for a mobile body such as a railway vehicle, a vessel, an aircraft, or a robot. The power supply may be also used for, for example, an electric product such as an information processing device.

The present examples and embodiments are to be considered as illustrative and not restrictive, and the invention is not to be limited to the details given herein, but may be modified within the scope and equivalence of the appended claims.

The invention claimed is:

1. A rechargeable battery comprising:
   a battery case that includes an open end and accommodates a power generating element;
   a cover that closes the open end of the battery case, wherein the cover includes an upper surface, a lower surface, a through hole that extends between the upper surface and the lower surface, and an inner wall that defines the through hole;
   a gasket that includes a tubular contact portion arranged on the inner wall of the cover, a through hole defined by the tubular contact portion, and a planar portion that is continuous with the tubular contact portion and arranged on the lower surface of the cover;
   an insulator arranged on the upper surface of the cover, wherein the insulator includes an upper surface, a lower surface, and a through hole that extends between the upper surface and the lower surface and is in communication with the through hole of the gasket;
   an external terminal arranged on the upper surface of the insulator, wherein the external terminal includes an upper surface, a lower surface, a through hole that extends between the upper surface and the lower surface and is in communication with the through hole of the insulator, and an inner wall that defines the through hole of the external terminal;
   a power collection terminal that extends through the through hole of the gasket, the through hole of the insulator, and the through hole of the external terminal to supply power from the power generating element to the external terminal; and
   an annular sealing member held between the lower surface of the cover and the planar portion of the gasket at an outer side of the tubular contact portion of the gasket, wherein
   the insulator is a resin-molded component,
   the inner wall of the insulator includes a lower open end, an upper open end, and a central portion located between the lower open end and the upper open end,
   at least one of the lower open end and the upper open end of the inner wall of the insulator has a larger diameter than the central portion of the inner wall of the insulator, and
   the diameter of the at least one of the lower open end and the upper open end is larger than a diameter of the through hole of the gasket and smaller than an inner diameter of the sealing member.

2. The rechargeable battery according to claim 1, wherein the diameter of the at least one of the lower open end and the upper open end is smaller than or equal to an outer diameter of the tubular contact portion of the gasket.

3. The rechargeable battery according to claim 1, wherein a step is formed between the central portion and the at least one of the lower open end and the upper open end.

4. The rechargeable battery according to claim 1, wherein the inner wall of the insulator includes a tapered surface that narrows from the at least one of the lower open end and the upper open end toward a center of the through hole of the insulator.

5. The rechargeable battery according to claim 1, wherein the lower open end of the inner wall of the insulator has a larger diameter than the central portion of the inner wall of the insulator.

6. The rechargeable battery according to claim 1, wherein the resin is one of nylon (PA) and polyphenylene sulfide (PPS).

7. The rechargeable battery according to claim 1, wherein the inner wall of the cover includes a lower open end, and the cover includes the sealing member at the lower open end of the inner wall.

* * * * *